Figure 1:
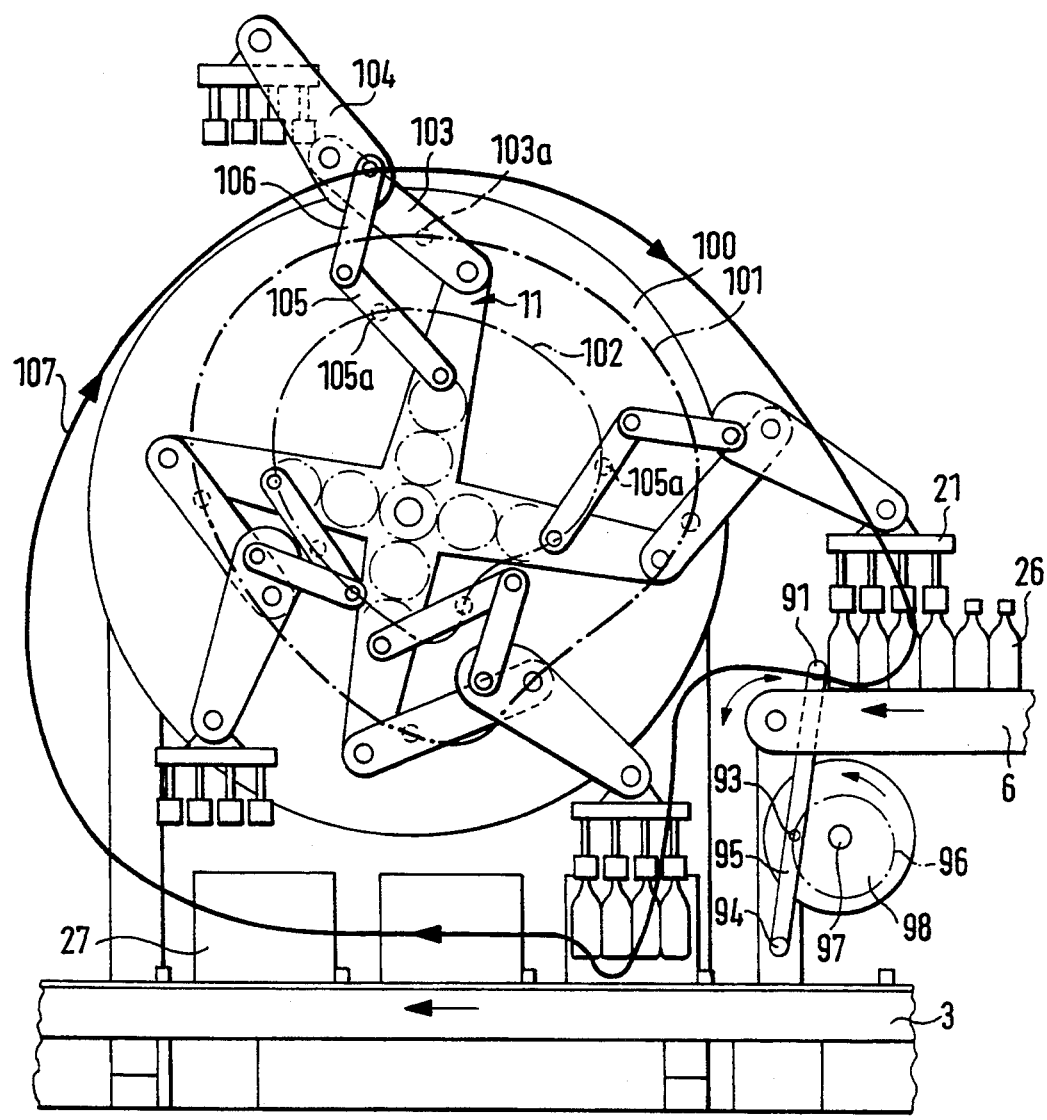

United States Patent [19]

Gmeiner

[11] Patent Number: 5,375,395
[45] Date of Patent: Dec. 27, 1994

[54] APPARATUS FOR SUPPLYING OR REMOVING VESSELS

[75] Inventor: Franz Gmeiner, Sinzing-Eilsbrunn, Germany

[73] Assignee: Krones AG Hermann Kronseder Maschinenfabrik, Neutraubling, Germany

[21] Appl. No.: 19,392

[22] Filed: Feb. 18, 1993

[30] Foreign Application Priority Data

Feb. 19, 1992 [DE] Germany ............................ 4204993

[51] Int. Cl.$^5$ ........................ B65B 21/18; B65B 35/46
[52] U.S. Cl. ........................................ 53/493; 53/55; 53/247; 53/251
[58] Field of Search ............... 53/493, 55, 251, 250, 53/249, 247, 248, 260, 255; 414/416

[56] References Cited

U.S. PATENT DOCUMENTS

| | | | |
|---|---|---|---|
| 4,457,121 | 7/1984 | Johnson et al. | 53/247 X |
| 4,459,794 | 7/1984 | Raudat | 53/247 X |
| 4,522,011 | 6/1985 | Bauers et al. | 53/247 X |
| 5,257,888 | 11/1993 | Kronseder | 53/247 X |

*Primary Examiner*—James F. Coan
*Attorney, Agent, or Firm*—Finnegan, Henderson, Farabow, Garrett & Dunner

[57] ABSTRACT

An apparatus for supplying or removing vessels including a conveyor means to or away from a continuously working packing machine. For adapting the supply or the removal of vessels to the sequence of movements of the packing machine in the best possible manner, the vessels are transported in an essentially closed formation by a conveyor means which is adapted to be driven continuosly at a periodically non-uniform speed in synchronism with the performance of the packing machine.

22 Claims, 3 Drawing Sheets

APPARATUS FOR SUPPLYING OR REMOVING VESSELS

DESCRIPTION

The present invention relates to an apparatus for supplying or removing groups of vessels, particularly bottles, in a packing machine.

Apparatuses are known in which a group of vessels is supplied continuously to a packing machine, subdividing means having a special structural design being used to separate the vessels into sets at the leading end of the group, whereupon said sets of vessels are accelerated in the direction of transport in a position- and speed-synchronous manner. For example, subdividing means are known, which are introduced from below and between the vessels within a group of vessels supplied by a conveyor belt.

Such subdividing means require a high mechanical expenditure, they are susceptible to trouble caused by external operational influences, e.g. pieces of broken glass, and, if the sizes dealt with by the packing machine are to be changed over, they have to be adaptable in an adequate manner to such change or exchanged.

The present invention is based on the task of providing an apparatus of the type disclosed by means of which the transport of vessels to or away from a packing machine can easily be adapted to the sequence of movements carried out by said packing machine.

In the case of the apparatus according to the present invention, the adaptation of vessel movement is effected by the conveyor means which leads to or away from the packing machine and which transports the vessels, said conveyor means being driven in a periodically non-uniform manner in synchronism with the packing machine. Due to the fact that, other than the known subdividing means, said conveyor means does not positively engage the external contour of the vessels to be transported, but supports said vessels, preferably in frictional engagement therewith, at the bottom surfaces, an adaptation of the sequence of motions can be carried out in an extremely simple manner independently of the contour or size of the vessels. This adaptation can be caused simply by altering the conveyor drive means.

The conveyor means can be driven by the drive means of the packing machine, whereby a very reliable speed and position synchronization of the conveyor means with respect to the packing machine is guaranteed. The non-uniform sequence of movements of the conveyor means can be generated by a variable-velocity mechanism which is integrated in the power train.

The conveyor means can, however, also be equipped with a drive means of its own, independently of the drive means of the packing machine. The generation of the desired non-uniform movement of the conveyor means can be achieved with the aid of a programmable control means. A very flexible adaptation will thus be possible, without any necessity of altering or converting the packing machine or the conveyor means, by simply altering the control program and the parameters influencing the non-uniform sequence of movements. The speed and position synchronization of the conveyor drive means with respect to the packing machine can be effected by position and speed sensors arranged on the packing machine.

Figure 2:
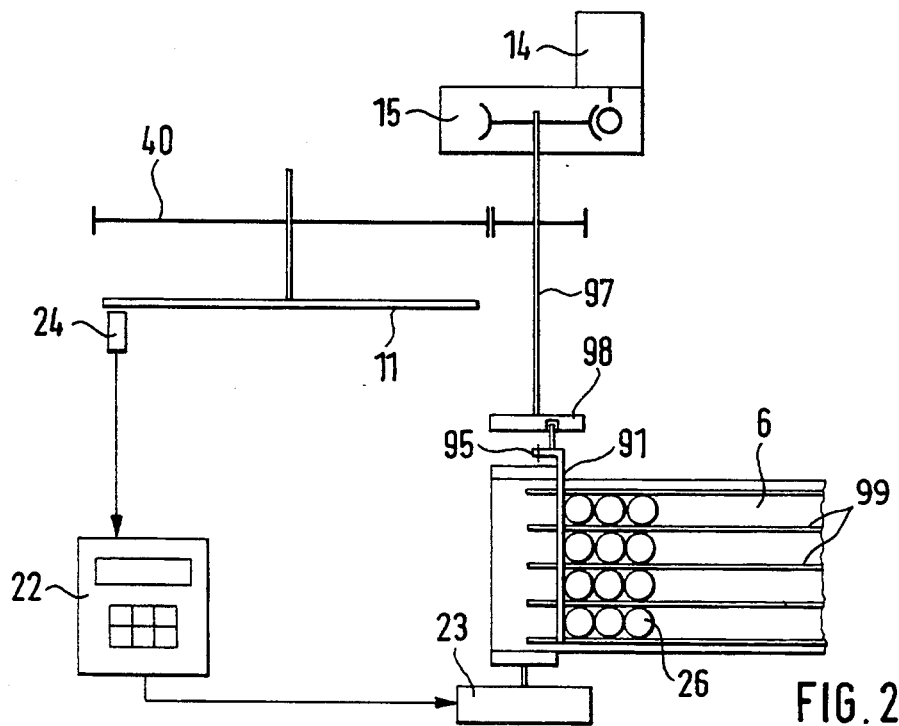
Figure 3:
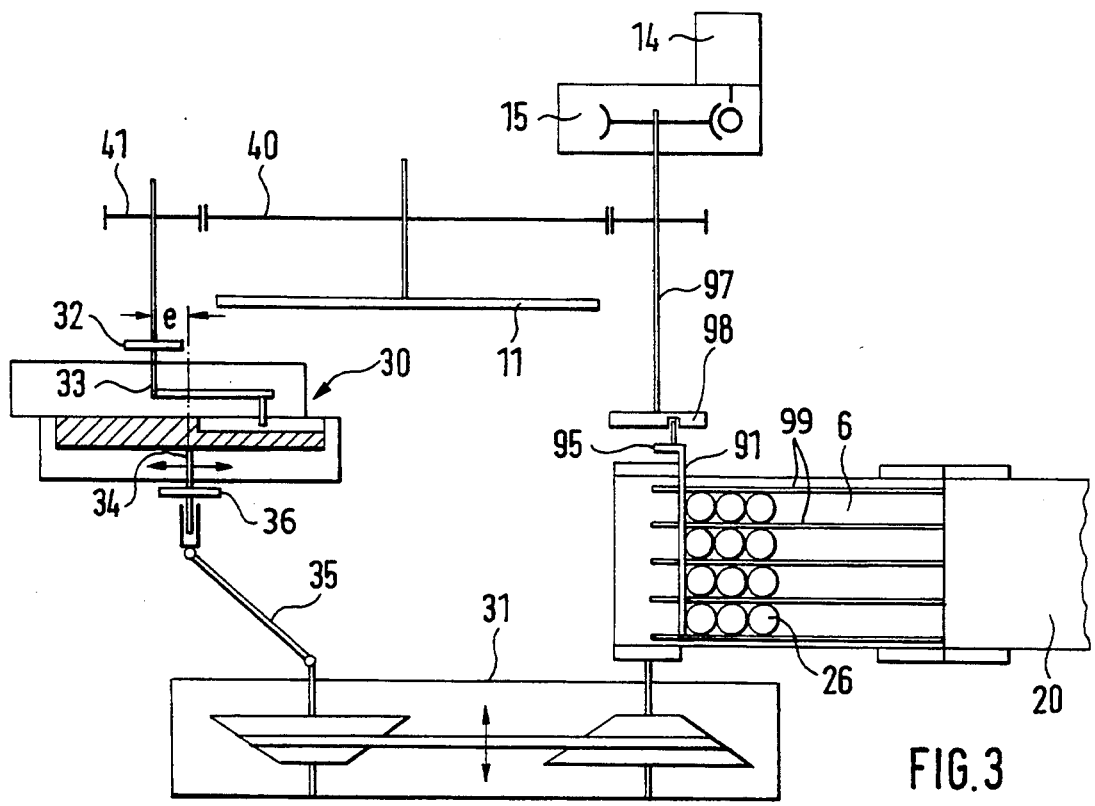
Figure 4:
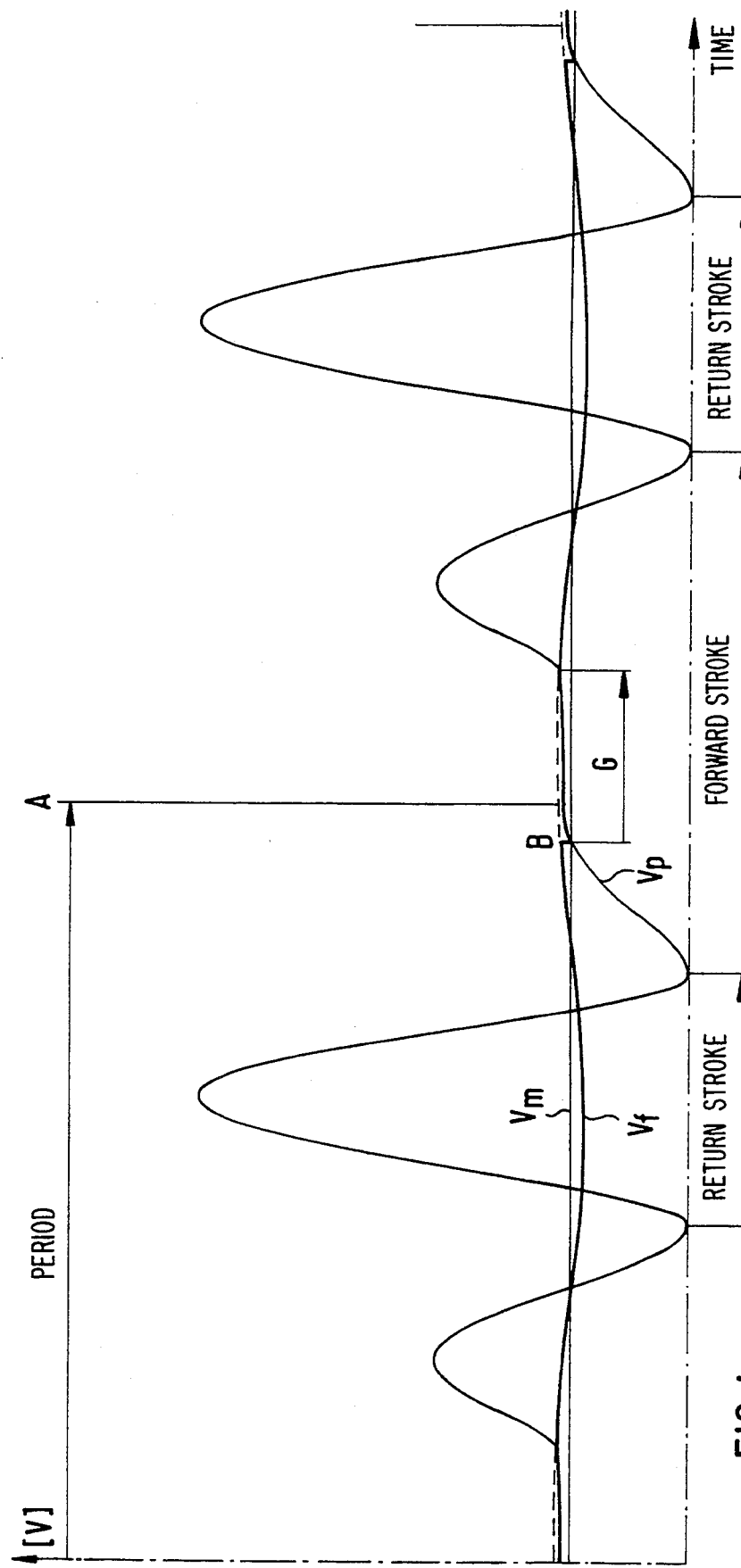

In the following, two embodiments of the present invention will be explained on the basis of a bottle packing machine with reference to the drawings, in which:

FIG. 1 shows a side view of a bottle packing machine,

FIG. 2 shows the driving scheme of an apparatus according to the present invention with an independent motor-operated drive of the bottle conveyor belt, FIG. 3 shows the driving scheme of an apparatus according to the present invention in accordance with a second embodiment in which the bottle conveyor belt drive is mechanically derived from the bottle packing machine, FIG. 4 shows the speed curve of the bottle conveyor belt, the speed curve of the bottle packing machine parts, which cooperate with the bottles, upon seizing said bottles, and the speed curve of the bottles during one operating cycle of the machine.

The bottle packing machine shown in FIG. 1 consists essentially of a continuously driven carrier means 11 having articulated thereon four packing heads 21, each of said packing heads 21 being articulated via levers 103 to 106. Parallel to the carrier means 11, which circulates in a vertical plane, is a stationary disk 100 having cam paths 101 and 102 arranged thereon, the levers 103 and 105 being controlled during one revolution of said carrier means 11 by said disk 100 with the aid of the guide rollers 105a and 103a, which engage the cam paths, in such a way that the packing heads 21 describe the circulatory path 107 shown. The bottles 26 to be packed are supplied in a compact group to the bottle packing machine by a horizontal bottle conveyor belt 6, whereas the empty cases 27 are supplied on a case conveyor belt 3 parallel to and located below the bottle conveyor belt 6. The bottles 26 can be supplied in a plurality of rows on said bottle conveyor belt 6, said rows being arranged in parallel when viewed from a direction perpendicular to the plane of the drawing. (See FIG. 2)

At the end of the bottle conveyor belt 6, a stop rod 91 is located, said stop rod 91 being secured to a pivotable lever 95 and extending transversely across the width of the bottle conveyor belt 6 as shown in FIG. 2. The pivotable lever 95, which pivots about the stationary journal 94, is provided with a guide roller 93 that engages the cam path 96 of a cam disk 98, which is synchronously driven by the bottle packing machine about rotating axle 97. The cam path 96 is constructed such that the stop rod 91 will first move in synchronism with the position as well as with the speed of the packing head 21 approaching the foremost bottles 26 of the group of bottles while said bottles 26 are being pressed against the stop rod 91 by the bottle conveyor belt 6 so that the packing head 21 can reliably take hold of said bottles from the top. Immediately afterwards, the stop rod 91 is accelerated in the direction of transport while the packing head 21 lifts the seized set of bottles off the bottle conveyor belt 6. In the meantime, the stop rod 91 can be pivoted back below the raised set of bottles in a direction opposite to the direction of transport of the bottle conveyor belt 6, and, subsequently, it can be re-accelerated in the direction of transport of the bottle conveyor belt 6, said re-acceleration being effected before the foremost row of bottles of the group of bottles moving up comes into contact with said stop rod 91. Due to the conveying speed of the bottle conveyor belt 6 which is, in the following phase, slightly faster than the speed of the stop rod 91, the group of bottles can softly be brought into contact with said stop rod 91.

Due to the slightly higher conveying speed of the bottle conveyor belt 6 in connection with the parallel guide rails 99, which extend in the direction of transport, the bottles 26 will be positioned exactly with respect to one another prior to being seized by the next packing head 21.

FIG. 2 shows, in a top view, a schematic representation of the bottle conveyor belt 6 provided with a separate drive means which is independent of the drive means of the bottle packing machine. The bottle conveyor belt 6 is driven by a controllable motor 23, e.g. a servomotor, which is controlled by a programmable control means 22. The control means 22 is able to recognize the instantaneous operating position of the packing machine by a rotary position sensor 24 arranged on the carrier means 11 or on its drive (motor 14, worm gearing 15).

Furthermore, the control means 22 is equipped with a memory for the control programs and the predeterminable parameter values influencing the development of the periodically non-uniform speed $V_f$ of the bottle conveyor belt 6, such as the mean speed, the phase displacement or the amplitude.

The advantage of such a control means 22 including a memory is that all data belonging to a specific type of bottle or a specific type of case can be stored and called up easily and within a very short period of time, if the packing machine is to be changed over to a different size bottle.

In the case of the second embodiment shown in FIG. 3, the bottle conveyor belt 6 is driven by the drive means of the bottle packing machine. The motor 14 of said bottle packing machine drives, via a worm gearing 15, the gear 40 which is connected to the carrier means 11 such that it is secured against rotation relative thereto. This gear 40 is engaged by a gear 41, which is connected to the drive shaft 33 of a Scotch yoke transmission 30 via an adjustable coupling 32. The drive shaft 33 drives a crank pin, which engages a crank guide means extending radially to the driven shaft 34 of the Scotch yoke transmission 30. The crank guide means, which is connected to the driven shaft 34 such that it is secured against rotation relative thereto, is adapted to be steplessly adjusted parallel to the drive shaft 33. The driven shaft 34 is connected to a steplessly adjustable frusto-conical disk transmission 31 via a coupling 36, which is also adjustable, and a cardan shaft 35 with integrated length compensation. Said frusto-conical disk transmission 31, in turn, drives the bottle conveyor belt 6. The transmission ratio between the bottle conveyor belt 6 and the revolving carrier means 11 of the bottle packing machine is infinitely variable by means of said frusto-conical disk transmission 31. The transmission ratio adjusted determines the mean speed $V_m$ of the bottle conveyor belt 6.

By means of the eccentricity e, which exists between the drive shaft 33 and the driven shaft 34 of the Scoth yoke transmission 30 and which is also infinitely variable, the amplitude of the sinusoidal rotary movement of the driven shaft 34 can be varied. The adjustment of the phase relation of the periodically non-uniform speed $V_f$ of the bottle conveyor belt 6 with respect to the stop rod 91 and the packing head 21 of the bottle packing machine can be effected by the releasable and steplessly adjustable coupling elements 32, 36.

A conveyor belt 20 connects the bottle conveyor belt 6, which is driven in a non-uniform manner, with a preceding machine, e.g. a labelling machine, in a packing line and can be driven by a separate drive means (not shown) in synchronism with the mean speed $V_m$ of the bottle conveyor belt 6.

In FIG. 4, the speed curves in two successive work cycles of the bottle packing machine are shown. $V_f$ refers to the non-uniform, sinusoidal belt speed of the bottle conveyor belt 6, and $V_m$ refers to the mean speed of said bottle conveyor belt 6. The curve provided with the reference symbol $V_p$ indicates the speed values of the stop rod 91 which is driven in an oscillating manner. When the bottles 26 are seized by the a packing head 21, the speed of the stop rod 91 is identical to that of the packing head 21, i.e. the stop rod 91 moves in synchronism with the speed and with the position of the packing head 21. The point A marks the operating point at which the packing head 21 seizes the bottles 26. Point B marks the operating phase in which the foremost bottles 26 of a group of bottles moving up come into contact with the stop rod 91, which is moving at a slightly slower speed, and are decelerated by said stop rod for positioning prior to the arrival of the packing head 21. The bottles, which are then being transported at the speed $V_f$ by the conveyor belt 6, are decelerated to the slightly lower speed $V_p$ of the rod 91 at point B. In the course of this process, a certain amount of slip will occur at the bottom of the bottles between the bottles and the belt 6. G is the phase in which the bottles and the stop rod 91 move in synchronism. The dotted line from point B to the end of phase G represents the speed of the conveyor belt 6 during this time period which, because of the stop rod 91 holding back the bottles, is slightly faster than that of the bottles. After point A, the bottles seized by the synchronously moving packing head 21 are lifted off the conveyor belt 6, whereupon the stop rod 91 will be accelerated in the direction of transport, delayed and, subsequently, pivoted back in a return stroke in a direction opposite to the direction of transport. Following this, the stop rod 91 will be reaccelerated in the direction of transport until the next group of bottles catches up with the stop rod 91.

The sinusoidal curve of the conveyor belt speed $V_f$ is chosen such that the delayed speed will coincide with the return stroke of the stop rod 91, whereby time will be gained for the return movement.

I claim:

1. In an apparatus including a conveyor means for supplying or removing vessels to or away from a packing machine for the packing or removing of groups of said vessels into or from cases adapted to hold a group of said vessels, wherein said packing machine has at least one packing head for transporting a group of said vessels from said conveyor belt to a case or from a case to said conveyor belt and drive means for continuously revolving said packing head through a closed circulatory path, the improvement comprising control means for continuously operating the conveyor belt at a periodically non-uniform speed ($V_f$) in synchronism with the movement of the packing head of the packing machine so that the vessels are continuously transported in an essentially closed formation at a periodically non-uniform speed to or away from a position where a packing head can engage or disengage a group of said vessels.

2. The apparatus of claim 1, wherein the control means controls the speed of the conveyor means so that for a period of time, just prior to engagement or just prior to disengagement, the packing head of the packing machine moves at the same speed as said group of vessels on the conveyor belt.

3. The apparatus of claim 2, wherein the control means also adjusts the phase relation between the non-uniform speed ($V_f$) of the conveyor means and the speed ($V_p$) of the packing head.

4. The apparatus of claim 3, wherein the control means adjusts the speed of the conveyor means so that the mean speed ($V_m$) of the non-uniform speed ($V_f$) of the conveyor means follows, during one complete revolution of the packing machine, the speed ($V_p$) of the packing head.

5. The apparatus of claim 4, wherein the relationship between the mean speed ($V_m$) of the conveyor means and the speed ($V_p$) of the packing head is adjustable.

6. The apparatus of claim 5, including means for adapting the packing machine to different sizes of vessels or cases, the control means including a memory of the various sizes to be handled by the machine and adjusting the periodically non-uniform speed ($V_f$) of the conveyor means to adapt the speed thereof to the different sizes.

7. The apparatus of claim 6, wherein the control means is adjustable while the packing machine is in operation.

8. The apparatus of claim 7, wherein the control means for the conveyor means is independent of the drive means of the packing machine and includes a separate drive means for producing said non-uniform speed ($V_f$) and a sensor for sensing the operating position of the packing machine.

9. The apparatus of claim 7, wherein the conveyor means is driven by the drive means of the packing machine, and the control means includes a variable velocity mechanism and a constant-velocity mechanism whose transmission ratio is variable integrated between the drive means of the packing machine and the conveyor means.

10. The apparatus of claim 9, wherein the transmission ratio of the constant-velocity mechanism is infinitely variable.

11. The apparatus of claim 9, wherein the rotary position of the variable-velocity mechanism relative to the drive means of the packing machine is steplessly adjustable.

12. The apparatus of claim 11, wherein the variable-velocity mechanism is a Scotch yoke transmission having a drive shaft and a driven shaft with an infinitely variable eccentricity between said shafts.

13. The apparatus of claim 12, wherein the Scotch yoke transmission has an adjustable part with a force transmitting element for compensating for shaft displacement.

14. The apparatus of claim 1, wherein the conveyor means is a horizontally circulating conveyor belt that supports the bottoms of the vessels.

15. The apparatus of claim 14, wherein the conveyor belt is located at an inlet of the packing machine.

16. The apparatus of claim 15, wherein the packing machine comprises a carrier means continuously revolving in a vertical plane and having at least one controllable packing head articulated thereon, said packing head being adapted to seize a group of said vessels at a leading end of the closed formation of vessels on the conveyor belt, move said group along a portion of said closed circulatory path and pack said group of vessels into a case.

17. The apparatus of claim 16, wherein the conveyor means is preceded by a feeding conveyor adapted to be driven in a uniform manner.

18. The apparatus of claim 17, wherein the feeding conveyor is driven in synchronism with the mean speed ($V_m$) of the conveyor means, the speed of the feeding conveyor being the same as the mean speed ($V_m$), if the conveying widths of the conveyor means and of the feeding conveyor are identical.

19. The apparatus of claim 1, including a stop means that extends transversely across the width of the conveyor means and which is adapted to be brought into contact with the leading end of the vessels on said conveyor means and to be displaced together therewith in the direction of movement of the vessels.

20. The apparatus of claim 19, wherein the stop means is displaced at a slightly slower speed than the speed ($V_f$) of the conveyor means.

21. The apparatus of claim 20, wherein said stop means comprises a stop bar at one end of a pivotable lever provided with a guide roller that engages a cam guide path on a rotary cam disc.

22. The apparatus of claim 21, wherein the rotation of said rotary cam disc is synchronized with the movement of the packing head.

* * * * *